15

3,067,091
INSECT COMBATTING
John E. Mahan and Roy E. Stansbury, Bartlesville, Okla., assignors to Phillips Petroleum Company, a corporation of Delaware
No Drawing. Filed June 3, 1958, Ser. No. 739,461
1 Claim. (Cl. 167—22)

This invention relates to combatting of insects. In one of its aspects the invention relates to combatting insects by repelling, or knocking down or killing them using a method with comprises subjecting the insect to the action of di-n-butyl sulfone. In another of its aspects the invention relates to an insect combatting agent having as an effective ingredient di-n-butyl sulfone. In a more specific aspect of the invention it relates to repelling of stable flies with di-n-butyl sulfone. This application is a continuation-in-part of Serial No. 632,271, filed January 3, 1957, now abandoned.

In said application there is disclosed and claimed an insecticidal composition containing as an essential active ingredient di-n-butyl sulfone. Also disclosed and claimed is a method of combatting an insect which comprises applying to said insect a composition comprising essentially di-n-butyl sulfone and an insecticide synergist. Furthermore, in said application there is disclosed and claimed a method of combatting a fly which comprises subjecting said fly to the action of di-n-butyl sulfone as the sole essential combatting agent required. Other disclosures and claims are also to be found in said application.

Insecticidal mixtures are widely used to control flies, roaches, and other insects. The field of insecticides is divided broadly into two classifications, agricultural insecticides and household insecticides. While the primary purpose of both of these types of insecticides is to kill the insect, other properties are also desirable, particularly in the household variety of insecticide. For example, the housewife is particularly interested in obtaining an insecticide which will quickly cause knockdown (paralysis) of flies, etc., even though the insect being attacked does not die for some period of time. The most widely used agent in insecticides which causes knockdown of flies and the like is pyrethrum. However, pyrethrum is an exremely expensive item, and even though very small amounts of pyrethrum are employed, it is advantageous, from an economic standpoint, to reduce the amount of pyrethrum in a given insecticidal mixture if this can be done without decreasing the rate of knockdown. Numerous agents have been found which can be employed as replacements for a portion of the pyrethrum in sprays for effecting quick knockdown of insects.

Control of stable flies is a particularly important problem on farms and ranches. The stable fly, *Stomoxys calcitrans* (Linn.), is a bad pest of domestic animals, particularly cattle, horses, etc. Stable flies have long, piercing mouth parts which they use to penetrate the skin of the animal and thus feed on the animal. They annoy the animals continuously, and weaken them by loss of blood. The resulting economic loss due to stable flies is especially noticeable in the case of dairy cows, as milk production diminishes remarkably when the cows are bothered by large numbers of stable flies. An effective stable fly repellent would be of great benefit to the farmer as it would both increase the production of milk and beef and improve the general state of health of his animals.

We have discovered that di-n-butyl sulfone is an effective insecticide and agent for producing quick knockdown and good kill of insects, particularly houseflies. Furthermore, we have also discovered that di-n-butyl sulfone, which is not effective as a repellent for houseflies, is an effective repellent for repelling stable flies.

It is an object of this invention to provide a method and composition for combatting insects.

It is an object of this invention to provide an insecticide or knockdown agent for insects, especially useful against flies. It is another object of this invention to provide a new knockdown agent for use as a replacement for a portion of the pyrethrum in insecticidal sprays.

It is a further object of this invention to provide an effective repellent for stable flies.

According to the present invention there is provided a method for combatting insects which comprises subjecting said insect to the action of di-n-butyl sulfone. Also, according to the invention there is provided an insect combatting composition which comprises di-n-butyl sulfone as an active ingredient.

More specifically, according to the invention di-n-butyl sulfone is used to repel stable flies, to knockdown insects such as flies and/or to kill insects such as flies, etc. Still more specifically, the invention provides a method and a composition for repelling, killing, and/or knocking down insects which can be the same or different in case of each action.

One skilled in the art in possession of this disclosure and having studied the same will understand that the compositions and rates of application can be the same or different to obtain the various combatting results of the invention. Thus, while herein there are described specific modes of application, carriers, components, and rates of application in the case of each specific action primarily sought to be accomplished, it will be clear to one skilled in the art that other manners of application, carriers, components of compositions, and rates of application can be employed and that since all of the conditions discussed herein with respect to one primarily sought result can apply to obtain also another of the results also discussed herein.

The insecticide additive of this invention is usually particularly effective when employed in an insecticidal composition in an amount within the range between 0.4 and 15 percent by weight, based on the total composition; amounts outside of this range being operative but being now not preferred. The insecticide of this invention is highly toxic to insects and can be used in insecticide compositions as the sole insecticidal agent, or it can be used in conjunction with known insecticides or insecticide synergists, such as pyrethrum, piperonyl butoxide, 1,1,1-trichloro-2,2-bis(p-chlorophenyl)ethane (DDT), 1,1,1-trichloro-2,2-bis(p-methoxyphenyl)ethane (Methoxychlor), the gamma isomer of 1,2,3,4,5,6-hexachlorocyclohexane (lindane), 2,3,4,5,6,7,8,8-octachloro-4,7-methano-3a,4,7,7a-tetrahydroindane (Chlordane) and the like. When di-n-butyl sulfone is employed alone, it is usually preferred to use a composition containing above about 3 weight percent of the sulfone. When employing the insecticide of this invention in solution in such materials as deodorized kerosene, a practical lower limit is a concentration of 0.004 gram/cubic centimeter of solvent employed. The upper limit for the concentration is dictated only by solubility in the solvent employed. When the insecticide of this invention is employed in an insecticide containing pyrethrum, an amount of di-n-butyl sulfone as low as 0.002 gram/cubic centimeter of solvent can be employed. In compositions containing both pyrethrum and the insecticide of this invention, the ratio of di-n-butyl sulfone to pyrethrum usually can be within the range between 20:1 to 140:1 by weight. A preferred ratio is from 40:1 to 80:1 on the same basis. Since the di-n-butyl sulfone is an effective repellent for stable flies it can be composited or admixed with other repellents as repellent synergists as later set forth more specifically.

The insecticide of the present invention can be used in any of the forms in which insecticides are commonly employed. For example, this insecticide can be employed in insecticidal compositions which are applied as solutions, emulsions, dusts, wettable powders, aerosols and the like. The preferred method of application of insecticidal compositions containing the insecticide of the present invention is in the form of a space spray, that is, is sprayed or atomized into a confined area in which insects are present. Another excellent method for applying the insecticide of this invention is to mix it into a wax and apply the wax-sulfone mixture to a surface such as tables, floors, etc.

When applying insecticides containing di-n-butyl sulfone in the form of aerosols, the di-n-butyl sulfone can be dissolved in such solvents as naphthas, Soltrol, kerosenes, toluene, cyclohexanone, acetone, and the like. These solutions can then be employed in an aerosol bomb in conjunction with a propellant such as Freon and other similar non-hazardous, compressible materials. It should also be understood that mixtures of two or more of the above solvents can be employed.

A preferred solvent with which unusually good results are obtained is Soltrol, a hydrocarbon solvent boiling within the range 260° F. to 800° F., obtained upon alkylation of an isoparaffin with an olefin in the presence of a catalyst, for example, hydrofluoric acid. Such a process is described in U.S. Patent 2,773,920, L. H. Vautrain and E. Strunk, issued December 11, 1956. This is an isoparaffinic material possessing properties which enhance the results obtained with the active ingredient.

The insecticide of this invention can be used in insecticidal compositions which are employed for killing such insects as flies, ants, gnats, mosquitoes, roaches, and the like, although they are particularly effective when employed in compositions for killing houseflies.

When used primarily as a repellent for stable flies, di-n-butyl sulfone is usually applied to deposit 1–50 grams of this active ingredient per 100 square feet. Lower or higher amounts can also be used. If less than one gram per 100 square feet is used the period of effective repellency will be correspondingly shortened.

The repellent of this invention can be applied to surfaces from which stable flies are to be repelled as solutions, powders, emulsions, aerosols, creams, fogs, lotions or the like. As will be understood by one skilled in the art, solvents or carriers which can be used should have no substantial detrimental effect upon the repellent activity of di-n-butyl sulfone or other repellents which are admixed therewith. When the repellent composition is applied to livestock, it must be substantially non-irritating and non-toxic to the animal. Examples of suitable carrier materials are petrolatum, acetone, deodorized kerosene, and high-boiling isoparaffinic hydrocarbons such as are prepared by the alkylation of paraffins with olefins using hydrofluoric acid or sulfuric acid as a catalyst, as later more fully described. Solid inert carrier materials such as talc, kieselguhr, and other inert carriers can be used in preparing dust. The repellent materials of this invention can also be applied in the form of emulsions, using such emulsifying agents as alklated aryl polyether alcohols.

When the insect combatting material of this invention is applied in a solvent or other carrier, the concentration of the material is governed by the method of application and adjusted so as to supply a desired amount per unit area.

When it is sought primarily to repel stable flies, it is within the scope of this invention to utilize other repellents in admixture with di-n-butyl sulfone. Not only can other stable fly repellents be admixed with this material, but repellents for other insects can also be used, for example, to improve the overall applicability of the repellent or to provide an all purpose repellent effective against stable flies. For example, the 2,3,4,5-bis-($\Delta^2$-butenylene)tetrahydrofurfurals of U.S. 2,572,577, the pyridine dicarboxylic acid diesters of U.S. 2,757,120 and the alkyl sulfoxides of Serial Number 661,584, filed May 27, 1957, can be used in these formulations. Other materials which can be employed are the halo-substituted sulfoxides of Serial Number 733,834, filed May 8, 1958, now U.S. Patent No. 2,944,932, and the repellent of Serial Number 742,-738, filed June 18, 1958, now U.S. Patent No. 2,952,582, 2-(1-aminocyclohexyl)cyclohexanone, can be employed. It is also within the scope of this invention to employ pyrethrum synergists in conjunction with the repellent formulations of this invention. For example, piperonyl butoxide, the n-octyl sulfoxide of isosafrole, N-(2-ethylhexyl)bicyclo[2.2.1]-5-heptene-2,3-dicarboximide can be employed. Since it is quite common for horn flies to be associated with stable flies, it is also within the scope of this invention to add an insecticidal ingredient to the repellent formulations, as horn flies are easily killed by many of the known commercial ingredients. An example of a material which can be used in the formulations of this invention to kill horn flies is Methoxychlor, 1,1,1-trichloro-2,2-bis(p-methoxyphenyl)ethane.

The following examples illustrate the invention and the specificity of the activity of di-n-butyl sulfone as compared with other closely related sulfones.

EXAMPLE I

A number of runs were made in which di-n-butyl sulfone was tested alone and in admixture with other materials as a repellent for stable flies. These runs were carried out in the following manner.

Organdy bags, fabricated from organdy sheets 10 inches square, were impregnated with 1 gram of the candidate repellent dissolved in 6 to 7 ml. of acetone and were then suspended on a line to dry. After 24 hours, the bags were drawn over the hand and exposed to several thousand hungry stable flies confined in 30-inch cubical cages. The time to the first bite was recorded. If no bites were received in 5 minutes, the bag was withdrawn and inserted on the following day. If, in the first five-minute exposure, bites were obtained, three successive five-minute exposures were made as described. If, however, no bites were obtained, further repetition was not made until the following day. The bags were suspended open to aeration between trials on successive days. Generally, the flies bite in less than a minute if they bite at all. If a bite was received, the number of seconds were counted to the first, second, and third bites. The results of these tests are given below in Table I.

Table I

| Compound | Dosage per bag | Seconds to first-second-third bites [1] | | | | |
|---|---|---|---|---|---|---|
| | | 1st day | 2nd day | 3rd day | 4th day | 5th day |
| 1 | 1 g | NB | NB | 55, 50, 38 | | |
| 1+2 | 0.5 g. each | NB | NB | 70, 75, 210 | | |
| 1+3 | do | NB | NB | 200, 240, NB | 15, 27, 5 | |
| 1+4 | do | NB | NB | NB | 130, 70, 15 | |
| 1+5 | do | NB | NB | NB | 145, 35, 80 | |
| 1+6 | do | NB | NB | NB | 27, 47, NB | |
| 1+2+7 | ⅛ g. each | NB | NB | 62, 150, 10 | | 85, 35, 52. |
| 1+3+7 | do | 55, 20, NB | 40, 29, 42 | | | |
| 1+4+7 | do | 200, NB | NB | NB | 35, 5, 104 | |
| 1+5+7 | do | NB | NB | NB | 35, 10, 7 | |
| 1+6+7 | do | NB | NB | NB | 21, 190, NB | 75, 25, 116. |
| 2 | 1 g | 70, NB | 15, 12, 9 | | | |
| 3 | 2 g | Bites received | | | | |
| 4 | 1 g | 125, 35, 7 | 60, NB | 35, 15, 35 | | |
| 5 | 1 g | 150, 200, NB | 185, 170, 25 | | | |

[1] NB equals no bites.

NOTE.—The repellants tested are coded according to the following code:
Compound No. 1—Di-n-butyl sulfone.
Compound No. 2—2,3,4,5-bis(Δ²-butenylene)tetrahydrofurfural.
Compound No. 3—Di-n-propyl isocinchomeronate.
Compound No. 4—2-(1-aminocylohexyl)cyclohexanone.
Compound No. 5—3-chloropropyl-n-octyl sulfoxide.
Compound No. 6—n-octyl-n-propyl sulfoxide.
Compound No. 7—N-(2-ethylhexyl) bicyclo [2.2.1]-5-heptene-2,3-dicarboxyimide.

EXAMPLE II

A number of organic sulfones were tested for various combatting properties by the following procedure.

An amount of the chemical to be tested as shown in Table II was dissolved in 12 cubic centimeters of the solvent indicated. This total solution was sprayed into a Peet-Grady chamber in which a known number of houseflies were contained. In each instance the total amount of the chemical was dissolved in the solvent before spraying into the chamber. The Peet-Grady chamber is a chamber of 216 cubic feet capacity (6' x 6' x 6'). The number of flies knocked down, e.g., paralyzed or dead, was counted at various time intervals, and the total number of flies that were dead at the end of 24 hours was counted. The results of these tests are expressed below as Table II.

EXAMPLE III

A number of runs were made by the same procedure and using the same quantity of solvent described in Example II in which di-n-butyl sulfone was tested both alone and in conjunction with pyrethrum as a knockdown agent for houseflies. Deodorized kerosene was used as the solvent in these tests. Control runs using pyrethrum alone were also made for comparison. The results of these runs are given below as Table III.

Table II

| Chemical | Solvent used [1] | Gms. chemical in 12 cc. solvent | Percent knockdown in X minutes | | | | | Percent mortality after 24 hours |
|---|---|---|---|---|---|---|---|---|
| | | | 2 | 4 | 6 | 8 | 10 | |
| n-Hexyl ethyl sulfone | 24% acetone, 16% xylene, 60% deod. kero. | 0.5 | 5 | 5 | 8 | 11 | 13 | 4 |
| Di-n-octyl sulfone | 40% xylene, 60% deod. kero | 0.24 | 14 | 13 | 15 | 17 | 17 | ([2]) |
| Di-n-propyl sulfone | 3% cyclohexanone, 97% deod. kero | 0.36 | 25 | 44 | 51 | 53 | 48 | 3 |
| Di-n-amyl sulfone | 40% toluene, 60% deod. kero | 0.36 | 3 | 3 | 5 | 4 | 4 | 83 |
| Tert-butyl vinyl sulfone | 10% cyclohexanone, 90% deod. kero | 0.18 | 18 | 18 | 18 | 20 | 30 | 24 |
| n-Amyl-n-propyl sulfone | Deod. kero | 0.36 | 37 | 54 | 63 | 89 | 93 | 3 |
| Do | do | 0.24 | 9 | 19 | 25 | 26 | 28 | 6 |
| n-Heptyl methyl sulfone | 4% cyclohexanone, 96% deod. kero | 0.12 | 3 | 7 | 11 | 14 | 16 | 8 |
| Di-n-butyl sulfone | 16% cyclohexanone, 84% deod. kero | 1.0 | 64 | 99 | 99 | 99 | 100 | 84 |
| Do | 8% cyclohexanone, 92% deod. kero | 0.5 | 54 | 95 | 97 | 97 | 98 | 65 |
| Do | 6% cyclohexanone, 94% deod. kero | 0.36 | 54 | 93 | 98 | 98 | 99 | 48 |
| Do | 2% cyclohexanone, 98% deod. kero | 0.24 | 53 | 85 | 95 | 96 | 98 | 11 |
| Do | Deod. kero | 0.12 | 40 | 87 | 90 | 94 | 94 | 15 |
| Do | do | 0.06 | 25 | 51 | 60 | 78 | 92 | 4 |
| Do | do | 0.03 | 13 | 14 | 15 | 27 | 29 | 3 |

[1] Deod. kero.—deodorized kerosene.  [2] Not measured.

Table II of the disclosure shows that di-n-butyl sulfone yields outstanding results. The only other sulfone, of the group of sulfones tested, which showed even a fair knockdown was n-amyl n-propyl sulfone. However, as the amount of n-amyl n-propyl shown was decreased from 0.36 gram per 12 cc. to 0.24 gram per 12 cc., the percent knockdown in 10 minutes decreased from 93 to 28. When di-n-butyl sulfone was used in the same solvent as was used for n-amyl n-propyl sulfone, the material still exhibited a knockdown activity of 92 percent in 10 minutes at the rather low concentration of 0.06 gram per 12 cc. This clearly demonstrates the outstanding results of the material of the present invention.

Table III

| Run No. | Grams di-n-butyl sulfone present | Grams pyrethrum present | Percent knockdown in X minutes | | | | | Percent mortality after 24 hours |
|---|---|---|---|---|---|---|---|---|
| | | | 2 | 4 | 6 | 8 | 10 | |
| 1 | 0 | 0.0012 | 29 | 34 | 38 | 46 | 50 | 7 |
| 2 | 0.024 | 0.0012 | 36 | 48 | 61 | 87 | 90 | 8 |
| 3 | 0.024 | 0 | 21 | 33 | 34 | 43 | 47 | 7 |
| 4 | 0.048 | 0.0012 | 34 | 53 | 55 | 91 | 91 | 2 |
| 5 | 0.048 | 0 | 18 | 32 | 36 | 42 | 43 | 3 |
| 6 [1] | 0.0 | 0.012 | 96 | 99 | 100 | 100 | 100 | 47 |

[1] This test was run to demonstrate that the fly colonies employed were normal.

EXAMPLE IV

A small amount of a three percent (by weight) solution of di-n-butyl sulfone in deodorized kerosene was poured onto a laboratory bench top which had been previously coated with a heavy coat of wax. The table top was later washed with acetone, but it was noted that flies landing on the surface were quickly paralyzed. Roaches were found to be affected so quickly by crawling across the surface that they failed to get off the treated area before they became paralyzed. A similar effect was noted for a ground beetle. This effect was noted to last for two to three days.

EXAMPLE V

A run was made in which di-n-butyl sulfone was tested to determine its repellency to house flies. Repellency to house flies was determined by the Sandwich Bait method which is essentially that disclosed by L. D. Kilgore in "Soap," June 1949. In accordance with this method, to a sheet of cardboard were applied two smooth, thin strips of unsulfured molasses about ⅜" wide and 3½" long, leaving a margin of at least ¼" all around, and a space of at least 1" between the strips. The prepared cardboard strips were then oven dried at 45° C. Strips of highly porous lens paper, 1" x 4" in dimension, were impregnated with di-n-butyl sulfone by immersing them in an acetone solution containing one weight percent of this compound, and then allowing the strips to dry over a period of 2 to 3 hours. An impregnated strip was then superimposed on each strip of molasses and fastened in place by stapling it to the cardboard backing. The loose, fibrous construction of the impregnated lens paper permits the flies to remove the molasses through the paper. The prepared strips were then exposed to about 150 house flies, *Musca domestica*, over five days old, which had been starved for six hours. The number of flies feeding on the molasses strips were recorded after 5 and 15 minutes, and each 15 minutes thereafter until either 165 minutes had elapsed or the molasses was gone. The results of these tests are tabulated below as a table. In this table, the word "gone" is used to denote the complete consumption of the molasses. For comparison purposes, the flies will completely consume the molasses in 15 to 30 minutes, and sometimes in as short a time as 5 minutes, when the material is non-repellent or when no repellent has been applied to the lens paper.

| Repellent tested | Number of flies feeding at indicated time in minutes | | | |
| --- | --- | --- | --- | --- |
|  | 5 | 15 | 30 | 45 |
| Di-n-butyl sulfone | 6 | 3 | 25 | Gone |

It is apparent from the above data that di-n-butyl sulfone is not effective as a repellent for house flies.

From the preceding example it will be noted that the discovery that di-n-butyl sulfone is an effective repellent for stable flies was entirely unexpected.

Reasonable variation and modification are possible within the scope of the foregoing disclosure and the appended claims to the invention, the essence of which is that di-n-butyl sulfone has been discovered to be an effective insecticide, an effective knockdown agent, a particularly effective combatting agent in combination with pyrethrum and other insecticidal composition ingredients, and an effective repellent for stable flies.

We claim:

A method of repelling a stable fly which comprises subjecting said fly to the action of a composition of approximately equal parts of di-n-butyl sulfone and a repellent selected from the group consisting of 2,3,4,5-bis($\Delta^2$-butenylene)tetrahydrofurfural, di-n-propyl isocinchomeronate, 2-(1-aminocyclohexyl)cyclohexanone, and 3-chloropropyl-n-octyl sulfoxide.

References Cited in the file of this patent

UNITED STATES PATENTS 2,572,577    Tissol    Oct. 23, 1951
2,757,120    Leonard    July 31, 1956

OTHER REFERENCES

Frear: A Catalogue of Insecticides and Fungicides, 1947, vol. I, page 58, Chronica Botanica Comp.

King: U.S. Dept. Agr. Handbook No. 69, May 1954, page 93.

Hartzell: Contributions From the Boyce Thompson Institute, 1949, vol. 15, pages 337–339.

Lindquist: U.S. Dept. Agr., Bulletin No. E-775, April 1949, pages 1–4 and 19.

Jones: 649 O.G. 603 (8-14-51).